July 15, 1952  T. M. FERRILL, JR  2,603,767
STABLE REFERENCE APPARATUS
Filed Aug. 2, 1946  2 SHEETS—SHEET 1
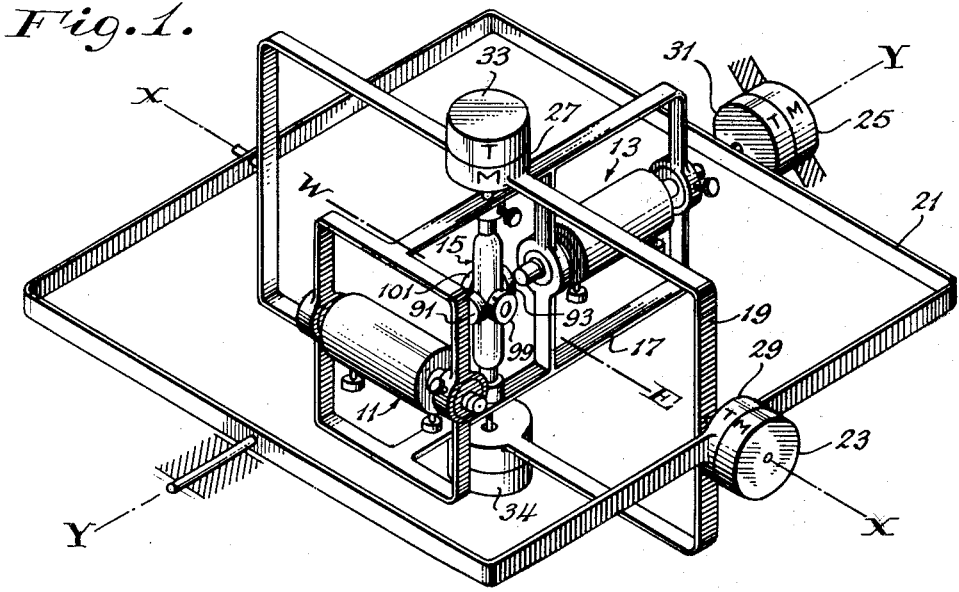
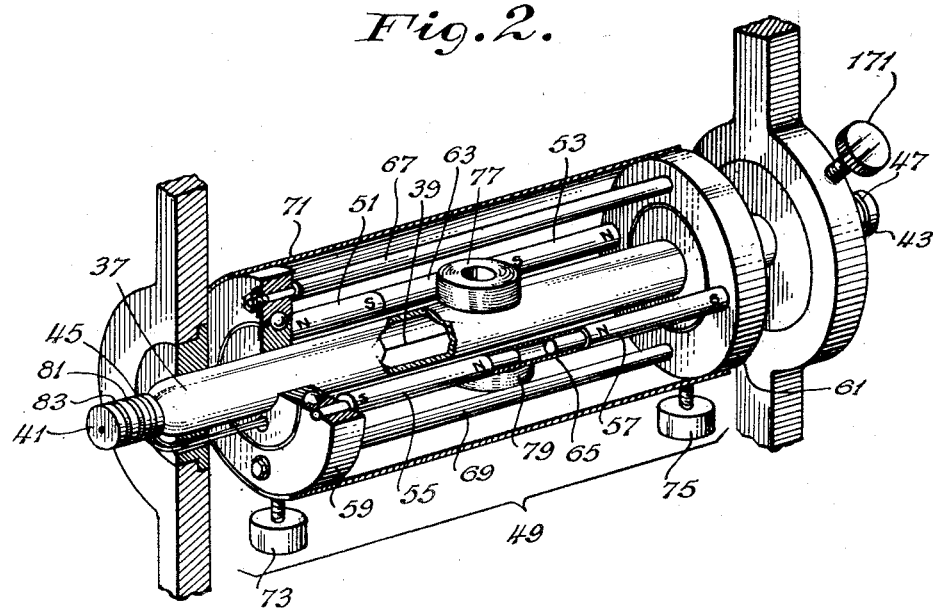
INVENTOR
THOMAS M. FERRILL, JR.
BY
Herbert H. Thompson
his ATTORNEY.

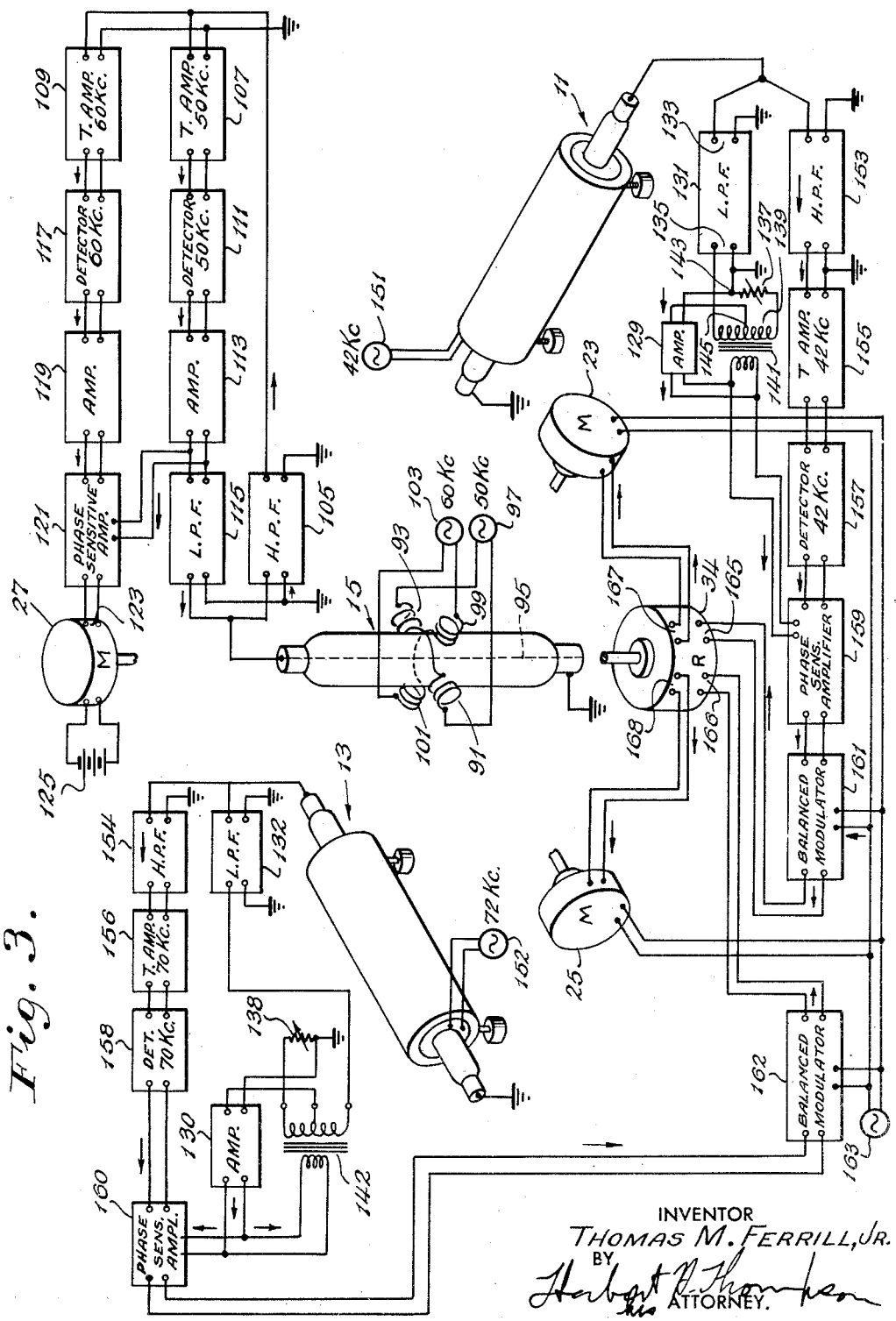

Patented July 15, 1952

2,603,767

UNITED STATES PATENT OFFICE 2,603,767

STABLE REFERENCE APPARATUS

Thomas M. Ferrill, Jr., Hempstead, N. Y., assignor to The Sperry Corporation, a corporation of Delaware Application August 2, 1946, Serial No. 688,159

9 Claims. (Cl. 318—19)

The present invention relates to stable reference apparatus, and is particularly concerned with apparatus for detecting variations of craft orientation from a predetermined attitude and heading, or for stabilizing an instrument to prevent changes of orientation thereof with changes of orientation of a craft in which the instrument is employed.

It is well known that a gyroscope embodying a universally suspended mass rotated at high speed may be employed for establishing a stable reference with respect to two perpendicular axes in space, and that two gyroscopes may be employed for establishing a universal reference about three perpendicular axes. Ordinarily, a gyroscope for a stable reference about two axes embodies a spinning rotor borne in a frame pivotally mounted in a gimbal ring, which latter is in turn pivotally mounted in a body or craft, the rotor-spinning axis and the gimbal ring pivot axes being mutually perpendicular. Variations of orientation of the body pivotally supporting the gimbal ring ordinarily are denoted by relative movements between the gimbal ring and the rotor-bearing frame, or relative movements between the gimbal ring and the body, according to the axis about which the body turns. Sensitive pick-offs have been provided at the gimbal pivot axes for transmitting orientation data signals to a control device, e. g., to an autopilot or to a gun-directing apparatus, for control of such a device in accordance with the changes of orientation of the body. Alternatively, an instrument to be stabilized, such as a sextant or a camera or a fire control sighting device has been mounted directly upon the rotor-bearing frame.

For such purposes as outlined above, the gyroscope rotor preferably is made massive relative to the apparatus or device to be supported upon the rotor-bearing frame, or massive relative to the orientation pick-off devices which are operated at the Cardan-suspension journals according to the relative orientation between the rotor-bearing frame and the body or craft. If a universal stabilization or three-axis reference device is required, the Cardan-suspension system is arranged for universal freedom of an inner stabilized frame, and at least two spinning rotor systems are provided therein, with resulting complexity of the arrangements for supplying rotor spinning power and for controlling the space orientations of the gyroscope rotors.

According to the present invention, a universal stabilization system is achieved without a requirement of massive spinning rotors. A plurality of vibratory sensitive devices are arranged upon a Cardan-suspended principal frame, and, through associated amplifiers and follow-up motors, are arranged for stabilization of the frame in space and for affording mutual stabilization among the sensitive devices. Three sensitive devices may be fixed in mutually perpendicular directions, and arranged in such a way that each device detects even a minute rotation of the principal frame about the axis of that device; and associated servo follow-up apparatus thereupon supplies power in the direction and extent required to suppress this rotation and to restore the principal frame to its normal orientation in space.

Each of the sensitive devices may incorporate a tightly stretched vibratory strand, along with an arrangement for sustaining transverse vibration of the strand in a predetermined plane normally containing the strand. A directional vibration pick-off is provided in each sensitive device for supplying a control voltage signal to the amplifier and positional control apparatus, to institute the above-described operation of the associated follow-up motor.

A sextant or a camera or other object to be stabilized may then be mounted directly upon the principal frame, along with the vibratory sensitive devices, or positional data transmitters may be provided at the journals of the Cardan-suspension system for supplying craft orientation data to an autopilot or fire control system or other system requiring such data.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

The above objects and features will become more clearly apparent and other objects will be recognized, from the following description of a preferred embodiment of the present invention, as illustrated in the drawings, wherein:

Fig. 1 illustrates a universal stabilization apparatus embodying the device of the present invention;

Fig. 2 is an isometric view, parts broken away, illustrating the construction of a vibratory sensitive device of the type employed in the structure shown in Fig. 1; and Fig. 3 illustrates the circuit arrangements associated with the components of the apparatus illustrated in Fig. 1.

Fig. 1 schematically shows an arrangement of three mutually perpendicular sensitive devices 11, 13 and 15 mounted in a frame 17 which is universally suspended through Cardan elements 19 and 21 for freedom about three mutually perpendicular axes. The principal frame 17 is journalled for freedom about a normally vertical axis in Cardan-suspension element 19; element 19 is journalled for freedom about a first horizontal axis X—X in frame 21; and frame 21 is in turn journalled about a second horizontal axis Y—Y in the body or craft from which the system of Fig. 1 is suspended, e. g., in an aircraft. Preferably, two of the sensitive elements 11 and 13 are arranged with their axes normally horizontal, and the third sensitive element 15 is arranged with its axis normally vertical.

A motor is provided on each Cardan-suspension axis for effecting relative rotation between the Cardan-suspension elements, in such a way as to produce desired effective rotations about the suspension axes between the frame 17 and the body or craft from which it is suspended. Where electrical signal responsive apparatus is to be controlled according to the relative orientation between the body or craft and the frame 17, a positional data signal transmitter may also be provided at each suspension journal axis. Motor 23 is provided for effecting relative rotation between suspension elements 19 and 21, and motor 25 is provided for effecting relative rotation between the supporting body or craft and suspension element 21. These motors 23 and 25 are employed as will appear more fully hereafter for keeping the journal axis of frame 17 vertical, in accordance with signals supplied by sensitive devices 11 and 13. A motor 27 is arranged to produce relative rotation about the vertical axis between suspension element 19 and the principal frame 17, according to signals from sensitive device 15.

Positional data transmitters or sensitive positional pick-offs 29, 31 and 33 are provided for supplying control signal data to an autopilot or other system requiring such data. A resolver 34 is provided for operation according to the relative rotation between frame 17 and suspension element 19, for reasons which will appear hereafter.

Sensitive devices 11 and 13 are similar in character, each being constructed as illustrated in Fig. 2. Each of these units provides an inductive device in the form of an evacuated rigid envelope 37 within which is stretched a slender strand 39 which may be attached at its ends to ferrules 41 and 43 sealed to the ends of the envelope 37.

The strand 39 is made of an electrically conductive material, to permit the passage of electric current therethrough induced therein by a transverse magnetic field. The strand 39 may be connected between a slip ring 45 on ferrule 41 and another slip ring 47 on ferrule 43, to facilitate arrangement of connections to the ends of strand 39 through suitable brushes.

A pendulous system 49 is rotatably suspended about the envelope 37, for producing a unidirectional magnetic field in a predetermined normal orientation relative to the direction of gravity, e. g., in a horizontal direction. For this purpose, bar magnets 51, 53, 55 and 57 are fixed in an arrangement as shown between permeable outer races 59 and 61 of a pair of bearings such as ball bearings arranged at the ends of the pendulous assembly 49. Ferrules or bushings 63 and 65 may be provided for interconnection of the magnets midway between the outer races 59 and 61. Tie rods 67 and 69 are provided to insure rigidity of the pendulous system, and a tubular shell or casing 71 of material of high permeability is provided for enclosing the tie rods and bearing elements, and for substantially confining the magnetic field of the magnet system to the interior of the shell 71. Masses 73 and 75 are suspended from the outer races 59 and 61, for fixing the normal alignment of the pendulous system relative to the direction of gravity.

A pair of coils 77 and 79 are mounted upon the envelope 37 and connected between slip rings 81 and 83. These coils are arranged with their axis directed perpendicular to the plane containing the axes of magnets 51, 53, 55, and 57, and thus, parallel to the direction of the forces acting upon the middle of the strand 39 when alternating current is passed therethrough to provide reactions with the transverse magnetic field. The axis of coils 77 and 79 is displaced slightly from intersection with the strand 39, in order to provide quiescent electromagnetic coupling between the coils and the strand.

Device 15 embodies construction features generally similar to those illustrated in Fig. 2, except that the pendulous assembly 49 is omitted, and a second pair of coils is provided upon the envelope directed along an axis substantially perpendicular to the axis of the first pair of coils. The tightly stretched strand in the device 15 may be arranged for vibration transverse the horizontal component of the earth's magnetic field, so that no local unidirectional magnetic field system is required to be associated with this unit.

Fig. 3 schematically illustrates the circuit interconnections of the electric circuit elements shown in Fig. 1. In the interest of clarity, these elements have been disassociated in Fig. 3 from the Cardan-suspension members, and the connections are indicated as direct rather than as extending through slip rings.

Coils 91 and 93 are directed along one axis transverse the strand 95 in unit 15, and are connected to a high frequency generator 97 illustrated as a 50-kilocycle generator. Coils 99 and 101 are directed along an axis transverse the axis of coils 91 and 93 and also transverse the strand 95, and are connected to a generator 103 of a different frequency, e. g., a frequency of 60 kilocycles per second. The axes of coils 99, 101 and coils 91, 93 preferably are displaced slightly from intersection with the axis of strand 95, so that a 50-kilocycle voltage component and a 60-kilocycle voltage component are induced in the strand 95 in the absence of movement of the strand. Upon vibration of the strand transverse the axis of coils 91, 93, there is induced in the strand 95 an additional 50-kilocycle voltage component modulated according to the velocity of movement of the strand 95, in such a way that the total 50-kilocycle voltage produced in the strand appears as a 50-kilocycle carrier wave with modulation at the fundamental frequency of vibration of the strand 95.

One end of the strand 95 is grounded, and the strand is connected to the input circuit of a high-pass filter 105. The output circuit of this filter is connected to the input circuit of a tuned amplifier 107 selectively responsive to the frequency of generator 97, and to the input circuit of a tuned amplifier 109 selectively responsive to the frequency of generator 103. The output circuit of amplifier 107 is connected to the input circuit of a detector 111, arranged to produce an output voltage corresponding to the modulation envelope of the energy induced in the strand 95 by coils 91, 93. This alternating voltage is amplified in an amplifier 113, and supplied through a low-pass filter 115 to the strand 95, for supplying sychronous drive current therethrough for reaction with the earth's magnetic field to sustain vibration of the strand 95 at a frequency corresponding with the fundamental period of vibration of the strand.

The voltage induced in the strand 95 by coils 99, 101 is amplified by amplifier 109 and supplied to a detector 117. If the strand 95 vibrates in such a way that its mid-point moves along a line parallel with the axis of coils 99 and 101, the 60-kilocycle voltage induced in the strand 95 remains unmodulated, and accordingly, no output voltage is produced by the detector 117. If the strand 95 vibrates in such a way that the mid-point thereof moves in a direction non-parallel with the axis of the coils 99, 101, then the 60-kilocycle voltage induced in the strand 95 is modulated with a modulation envelope of the frequency of vibration of strand 95. Accordingly, the detector 117 then produces an alternating output voltage of this frequency. This voltage is amplified in an amplifier 119 and supplied to the principal input circuit of a phase sensitive amplifier 121 which is supplied with a phase reference voltage by amplifier 113. The phase sensitive amplifier 121 provides an output voltage of polarity varying according to the direction of divergence from parallel relation between the direction of movement of the midpoint of strand 95 and the axis of coils 99, 101, and of magnitude varying as the extent of this divergence.

This voltage may be supplied to one input circuit 123 of motor 27, which may be a direct voltage motor, and which may have an input circuit fixedly supplied by a direct voltage source such as a battery 125. The direction and speed of operation of motor 27 depends upon the polarity and magnitude of the output signal supplied by amplifier 121, and hence upon the direction and extent of the divergence above described. Connections to the motor 27 are so arranged that this motor turns the frame 17 (Fig. 1), and the device 15 affixed thereto, about the vertical axis in the direction to restore parallel alignment between the axis of coils 99, 101 and the direction of movement of the midpoint of strand 95.

Where the earth's magnetic field is relied upon for reaction with the alternating current through strand 95 supplied through amplifier 113 and filter 115 to sustain the vibration of the strand, the strand is urged to vibrate in the east-west vertical plane, and accordingly, the axis of coils 99, 101 is retained in the east-west direction by the action of motor 27. Thus, the frame 17 is held in a substantially fixed azimuthal orientation, and accordingly, the positional transmitter 33 provides an output signal varying according to variations of heading of the craft.

The sensitive device 11 is provided with a bridge feedback circuit for sustaining vibration of the strand therein at its fundamental period in the direction normally transverse the plane containing the axes of the magnets. This feedback circuit, of a type described and claimed in patent application Serial No. 556,525 filed September 30, 1944, now Patent No. 2,546,158 by Montgomery H. Johnson, comprises an amplifier 129 having its input circuit and its output circuit coupled to the strand in device 11 through a low-pass filter 131. One pair of terminals 133 of the filter are connected to the ends of the strand, and the opposite pair of terminals 135 are connected in series with a resistor 137 across a tapped secondary winding 139 of a transformer 141 having its primary winding connected to the output terminals of the amplifier 129. The injunction 143 between the filter 131 and the resistor 137 is grounded, and the input circuit of amplifier 129 is connected between this junction and the midtap 145 of the secondary winding 139.

The resistor 137 is adjusted to such a condition that the feedback from the output circuit of amplifier 129 through transformer 141 and the circuit including the mid-tap 145 and the junction 143 to the input circuit of the amplifier 129 is, in the absence of vibration of the strand in device 11, unable to provide a sustained oscillatory condition in the amplifier 129. With vibration of the strand transverse the magnetic field, however, a back-E. M. F. is generated in the strand, and this back-E. M. F. is of such phase and polarity as to provide an oscillation-sustaining signal condition at the input circuit of amplifier 129. Accordingly, this amplifier supplies vibration-sustaining alternating current through the low-pass filter 131, to provide continued vibration of the strand in unit 11 at its natural period determined by the tension, mass and the length of the strand in device 11.

A similar vibration sustaining circuit including an amplifier 130, a transformer 142, a resistor 138 and a low-pass filter 132 is provided in connection wtih device 13.

A high-frequency signal source 151 is connected to the transverse coils in the device 11 for providing a high-frequency alternating magnetic field transverse the strand therein. While the frequency of the generator 151 could be of the same order as the frequency of either generator 97 or generator 103, enhanced isolation and simplification of high-frequency shielding problems are afforded by making generator 151 of a frequency different from the frequencies of generators 97 and 103, e. g., of a frequency such as 42 kilocycles per second.

The strand in device 11 is connected to the input circuit of a high-pass filter 153, and the output circuit of this filter is connected to the input circuit of an amplifier 155 tuned to 42 kilocycles for affording selective response to signals of the frequency of generator 151. The output circuit of amplifier 155 is coupled to a detector 157, and the output circuit of this detector is coupled to the principal input terminals of a phase sensitive amplifier 159 having a pair of phase reference terminals connected to the output circuit of amplifier 129. The output circuit of the phase sensitive amplifier 159 provides a voltage of polarity and magnitude varying according to the direction and extent of divergence from parallelism between the axis of the coils in device 11 and the direction of vibration of the mid-point of the strand therein.

This voltage is supplied to the input circuit of a balanced modulator 161 which is supplied also with input voltage from a generator 163 which may be a 400-cycle power-generating system such as is ordinarily provided on modern aircraft. The balanced modulator 161 provides a 400-cycle output voltage of phase and amplitude corresponding to the polarity and magnitude of the voltage supplied thereto by phase sensitive amplifier 159. This 400-cycle output voltage is supplied to one pair of input terminals 165 of the resolver 34.

A generally similar circuit is provided in connection with sensitive device 13. This circuit includes a high-pass filter 154, a tuned amplifier 156, a detector 158, a phase sensitive amplifier 160 having its principal input circuit supplied by detector 158 and its phase reference input circuit supplied by amplifier 139, and a balanced modulator 162 having its controlling input circuit supplied by phase sensitive amplifier 160 and its 400-cycle input circuit supplied by generator 163. The generator 152 connected to the coils in device 13 is tuned to a frequency to which amplifier 156 is selectively responsive, and this frequency preferably is different from the frequencies of generators 97 and 103 and also from the frequency of generator 151. The generator 152 is represented as being of a frequency of 72 kilocycles.

The output circuit of balanced modulator 162 is connected to a second pair of input terminals 166 of the resolver 34. One output circuit of the resolver is connected to one pair of input terminals of motor 25, which is represented as a 400-cycle, two-phase motor, and the other pair of input terminals of motor 25 is connected to generator 163. The other output winding of the resolver 34 is connected similarly to one 400-cycle input circuit of motor 23, and the other phase input circuit of motor 23 is connected to generator 163.

Motors 23 and 25 are reversibly controlled according to the phase and amplitude of the signals supplied to these motors through the resolver 34. The resolver 34 is so arranged that when the axis of motor 23 is parallel with the axis of device 11, a condition illustrated in Fig. 1, a slight divergence from parallelism between the axis of the coils and the direction of movement of the mid-point of the strand in device 11 results in production through balanced modulator 161 of a 400-cycle output signal which is transferred from input circuit 165 of the resolver 34 to output circuit 167 of the resolver, and thence to motor 23, in the phase to cause rotation of motor 23 in the direction to restore parallelism between the coil axis and the direction of movement of the strand mid-point, and thus to suppress a tendency of the frame 17 to depart from its normal orientation with the pivotal axis thereof vertical. Similarly, with the relative positioning of the elements as shown in Fig. 1, a detected divergence in device 13 results in transfer from input circuit 166 to output circuit 168 of the resolver of a 400-cycle alternating voltage of such phase as to cause motor 25 to operate in the manner to restore the frame 17 to its normal orientation.

Upon the occurrence of a 90° change of relative orientation between frame 17 and suspension element 19, as with a change of heading of the craft through a 90° angle, the axis of device 11 becomes parallel with the axis of motor 25, and the axis of device 13 becomes parallel with the axis of motor 23. If the output circuits of modulators 161 and 162 were connected directly to the phase control input circuits of motors 23 and 25, such a change of heading of the craft would disrupt the operation of the system, and render devices 11 and 13 and motors 23 and 25 incapable of operating jointly to retain the pivotal axis of frame 17 vertical. The resolver 34, however, operates upon relative rotation between frame 17 and element 19 to effect a corresponding shift in the intercoupling between modulators 161 and 162 and the motors 23 and 25. Through the resolver 34, a 90° rotation about the vertical axis described above produces a complete interchange of the coupling to motors 23, 25, rendering motor 23 responsive only to divergence signals from device 13 and motor 25 responsive only to divergence signals from device 11. Intermediate changes of relative orientation about the vertical axis produce conditions in which each of the motors 23 and 25 is controlled partly by device 11 and partly by device 13, in relative extents depending upon the comparison of the angles between the axes of the devices and the motors.

Each of the sensitive devices 11, 13 and 15 is arranged in the principal frame 17 in such a way as to permit rotation of the device to a desired position about its own axis, and locking of the device at such a position. For this purpose, the envelope of each unit may be journalled in the frame 17, and a thumbscrew such as the thumbscrew 171 illustrated in Fig. 2 may be provided for locking the envelope in a desired position. Accordingly, while frame 17 may be arranged, if desired, for alignment parallel with the vertical, the east-west, and the north-south axes, it may on the other hand be set for any desired inclination or angle of divergence relative to these axes, by the institution of an appropriate change of adjustment of one or more of the sensitive devices within frame 17.

The feature of ready adjustability of the sensitive devices in frame 17 is advantageous, for example, where it is desired to compensate for the tendency toward inclination of the pivotal axis of unit 17 in a westerly direction as a consequence of the earth's rotation. To overcome this tendency, the envelope of device 13 may be rotated counterclockwise as viewed in Fig. 1, through a very small angle, depending upon the latitude at which the instrument is employed, and reset in such a way that when the pivotal axis of frame 17 is vertical, the axis of the coils affixed to the enevelope in device 13 is inclined slightly in a westerly direction. Accordingly, even when the pivotal axis of frame 17 is vertical, the resultant motive torques applied to the frame 17 about the axis 13 are in a direction clockwise as viewed in Fig. 1, and in such relation with the rotation of the earth as to prevent inclination of the pivotal axis of frame 17 in the westerly direction.

The principal features of a device of the type illustrated in Fig. 2 are illustrated and claimed in Letters Patent No. 2,479,563 issued to the present inventor, and the arrangement of a compass system or a vibratory stable reference instrument responsive to the earth's magnetic field, and employing two pairs of transverse coils of the type illustrated at 15 in Fig. 1 is described and claimed in Letters Patent No. 2,479,562 issued to the present inventor. Furthermore, the stretched strand employed in the devices 11, 13 and 15 may be made of magnetostrictively responsive material, and coaxial coils may be affixed to the strand-supporting envelopes and energized with alternating current synchronously with the current passed through the strand, for enabling longitudinal driving forces to bear the major part of the burden of sustaining vibrations of the strand, as illustrated and claimed in Letters Patent No. 2,466,018 issued to the present inventor.

Finally, in order to obtain maximum persistence of planar vibration of the strands in the sensitive devices 11, 13 and 15, the transverse coils of each device may be fixed on the envelope at an orientation parallel to the preferred plane of vibration, i. e., the plane of least elastic restraint toward which the vibration of the wire tends following institution of vibration thereof in an arbitrary direction, in accordance with the principles of patent application Serial No. 688,160 filed concurrently herewith by A. L. Rawlings, now Patent No. 2,552,650.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Stable reference apparatus comprising a frame, means for universally suspending said frame for freedom in space, first and second divergent inductive horizontal strands each stretched between two points and supported by said frame, first and second pendulous magnetic-field directing means respectively pivoted about said first and second strands, a third inductive strand stretched vertically between two points and supported by said frame subject to a directed magnetic field, means for passing alternating currents through said first, second and third strands to produce vibration of said strands in planes transverse the magnetic fields to which they are subjected, and means responsive to the output of said strands for controlling the orientation of said frame to suppress changes of the directions of vibration of said strands relative to the respective magnetic fields.

2. Stable reference apparatus comprising a frame universally suspended for freedom about three axes, means for stabilizing said frame about first and second divergent horizontal axes, an inductive device having a vertical strand stretched between two points supported by said frame, means for maintaining transverse vibration of said strand comprising means for applying alternating voltage to said strand to maintain vibration thereof in the east west vertical plane perpendicular to the horizontal component of the earth's magnetic field and means responsive to relative displacement of said frame and said plane of vibration for controlling the orientation of said frame about the vertical axis according to the direction of the plane of vibration of said strand.

3. In a stable reference apparatus, a frame, means supporting said frame with freedom about two mutually perpendicular normally horizontal axes, and means for stabilizing said frame about one of its axes including an inductive device having a vibrating element mounted on said frame for vibration transverse of the other of the axes of said supporting means, means for vibrating said element, means pendulously mounted on said frame providing a reference magnetic field in which said element vibrates to induce a signal therein upon departure of the frame from an oriented relation to the magnetic field reference means, and means operated by said signal effective about the stabilization axis for restoring said frame to an oriented relation to the magnetic field reference means.

4. In a stable reference apparatus, a frame, means supporting said frame with freedom about two mutually perpendicular normally horizontal axes, and means for stabilizing said frame about one of its axes including an evacuated envelope fixed to said frame having an electrical conducting strand stretched between two points therein to vibrate transverse of the other of the axes of the supporting means, means for vibrating said strand, means pendulously mounted on said frame providing a reference magnetic field in which said strand vibrates to induce a signal therein upon departure of the frame from an oriented relation to the magnetic field reference means, and means operated by said signal effective about the stabilization axis for restoring said frame to an oriented relation to the magnetic field reference means.

5. In a stable reference apparatus, a frame, means supporting said frame with freedom about two mutually perpendicular normally horizontal axes, and means for stabilizing said frame about said axes including a pair of inductive devices with individual vibrating elements mounted on said frame for vibration transverse of the respective axes of said supporting means, means for vibrating said elements, first and second pendulous magnetic field directing means pivoted about the respective inductive devices, torque means at one of the axes of said supporting means responsive to the output of one of said inductive devices, and torque means at the other of the axes of said supporting means responsive to the output of the other of the inductive devices.

6. An apparatus as claimed in claim 5, including means supporting said frame with freedom about a vertical axis, and means for resolving the output of said inductive devices between said torque means in accordance with the position of said frame about its vertical axis of support.

7. In a stable reference apparatus, a frame, means supporting said frame with freedom about two mutually perpendicular normally horizontal axes, and means for stabilizing said frame about said axes including a pair of evacuated envelopes fixed to said frame having individual electrical conducting strands stretched between two points therein to vibrate transverse of the respective axes of the supporting means, means for vibrating said strands, first and second pendulous magnetic field directing means pivoted about the respective envelopes, torque means at one of the axes of said supporting means responsive to the output of one of the strands, and torque means at the other of the axes of said supporting means responsive to the output of the other of the strands.

8. Stable reference apparatus comprising a frame, means for mounting said frame with freedom about two mutually perpendicular horizontal axes and a vertical axis, first and second inductive devices having individual elements mounted on said frame for vibration transverse of the respective horizontal axes of said mounting means, first and second pendulous magnetic field directing means pivoted about the respective devices, a third inductive device having a vibrating element mounted on said frame for vibration subject to a directed magnetic field, means for vibrating the elements of said first, second and third devices, and means responsive to the output of said devices for controlling the orientation of said frame about said respective axes to suppress changes of the directions of vibrations of the devices relative to the respective magnetic fields.

9. Apparatus as claimed in claim 8, including means for resolving the outputs of the first and second devices between the respective controlling means at the horizontal axes of said mounting means.

THOMAS M. FERRILL, JR.

REFERENCES CITED

The following references are of record in the file of this patent:

UNITED STATES PATENTS

| Number | Name | Date |
|---|---|---|
| 1,279,471 | Sperry | Sept. 17, 1918 |
| 1,702,405 | Holmes | Feb. 19, 1929 |
| 1,840,104 | Anschutz-Kaempfe | Jan. 5, 1932 |
| 1,976,648 | Wittkuhns | Oct. 9, 1934 |
| 2,014,825 | Watson | Sept. 17, 1935 |
| 2,027,393 | McCreary | Jan. 14, 1936 |
| 2,308,566 | Noxon | Jan. 19, 1943 |
| 2,309,853 | Lyman et al. | Feb. 2, 1943 |
| 2,331,617 | Moore | Oct. 12, 1943 |
| 2,376,883 | Riggs | May 29, 1945 |
| 2,383,459 | Beach | Aug. 28, 1945 |
| 2,434,324 | Lehde | Jan. 13, 1948 |

FOREIGN PATENTS

| Number | Country | Date |
|---|---|---|
| 187,104 | Germany | July 20, 1907 |